United States Patent
Huang

(10) Patent No.: US 10,437,887 B1
(45) Date of Patent: Oct. 8, 2019

(54) DETERMINING INTENT OF TEXT ENTRY

(71) Applicant: Google LLC, Mountain View, CA (US)

(72) Inventor: Wei Huang, Seattle, WA (US)

(73) Assignee: Google LLC, Mountain View, CA (US)

(*) Notice: Subject to any disclaimer, the term of this patent is extended or adjusted under 35 U.S.C. 154(b) by 261 days.

(21) Appl. No.: 15/373,346

(22) Filed: Dec. 8, 2016

Related U.S. Application Data

(63) Continuation of application No. 14/324,343, filed on Jul. 7, 2014, now abandoned, which is a continuation of application No. 11/938,692, filed on Nov. 12, 2007, now Pat. No. 8,775,407.

(51) Int. Cl.
| | |
|---|---|
| G06F 16/00 | (2019.01) |
| G06F 16/9032 | (2019.01) |
| G06F 16/248 | (2019.01) |
| G06F 16/2455 | (2019.01) |
| G06F 3/023 | (2006.01) |
| G06F 15/02 | (2006.01) |

(52) U.S. Cl.
CPC ...... *G06F 16/90324* (2019.01); *G06F 3/0233* (2013.01); *G06F 15/0225* (2013.01); *G06F 16/248* (2019.01); *G06F 16/2455* (2019.01)

(58) Field of Classification Search
CPC ............. G06F 16/9577; G06F 16/3322; G06F 16/9532; G06F 16/901; G06F 16/17; G06F 16/54; G06F 16/358; G06F 3/0233; G06F 15/0225
See application file for complete search history.

(56) References Cited

U.S. PATENT DOCUMENTS

| | | |
|---|---|---|
| 5,495,608 A | 2/1996 | Antoshenkov |
| 5,701,469 A | 12/1997 | Brandli et al. |
| 5,745,894 A | 4/1998 | Burrows et al. |
| 5,758,145 A | 5/1998 | Bhargava et al. |
| 5,825,306 A | 10/1998 | Hiyokawa et al. |
| 5,845,273 A | 12/1998 | Jindal |
| 5,915,251 A | 6/1999 | Burrows et al. |
| 5,953,073 A | 9/1999 | Kozina et al. |
| 5,978,792 A | 11/1999 | Bhargava et al. |
| 6,026,411 A | 2/2000 | Delp |
| 6,038,365 A | 3/2000 | Yamagami |
| 6,049,796 A | 4/2000 | Siitonen et al. |
| 6,125,287 A | 9/2000 | Cushman |
| 6,169,999 B1 | 1/2001 | Kanno |

(Continued)

FOREIGN PATENT DOCUMENTS

WO    WO 03/073324    9/2003

OTHER PUBLICATIONS

Eric Jui-Lin Lu*, et al. "Design and implementation of a mobile database for Java phones",Computer Standards & Interfaces 26 (2004) 401-410.

(Continued)

*Primary Examiner* — Srirama Channavajjala
(74) *Attorney, Agent, or Firm* — Fish & Richardson P.C.

(57) ABSTRACT

Methods and systems for identifying information based on matching information to a query based on an index value are disclosed. In one aspect, a method for identifying information entered by a user includes computing an numeric index value, receiving input, calculating a query value, comparing the query value to the index value, and displaying items from the dataset.

22 Claims, 9 Drawing Sheets

(56) References Cited

U.S. PATENT DOCUMENTS

| | | | |
|---|---|---|---|
| 6,262,735 B1 | 7/2001 | Etelapera | |
| 6,278,992 B1 | 8/2001 | Curtis et al. | |
| 6,353,820 B1 | 4/2002 | Edwards | |
| 6,377,961 B1 | 4/2002 | Ryu | |
| 6,411,822 B1 | 6/2002 | Kraft | |
| 6,421,662 B1 | 7/2002 | Karten | |
| 6,484,179 B1 | 11/2002 | Roccaforte | |
| 6,529,903 B2 | 3/2003 | Smith et al. | |
| 6,557,004 B1 * | 4/2003 | Ben-Shachar | G06F 16/9577 707/706 |
| 6,624,809 B1 | 9/2003 | Kowaguchi | |
| 6,865,575 B1 | 3/2005 | Smith et al. | |
| 7,007,239 B1 * | 2/2006 | Hawkins | H04M 1/0254 379/93.23 |
| 8,074,172 B2 | 12/2011 | Kocienda et al. | |
| 8,775,407 B1 | 7/2014 | Huang | |
| 2002/0045463 A1 | 4/2002 | Chen et al. | |
| 2002/0126097 A1 | 9/2002 | Savolainen | |
| 2003/0142125 A1 | 7/2003 | Salmimaa et al. | |
| 2004/0080544 A1 | 4/2004 | Stripling | |
| 2005/0043947 A1 | 2/2005 | Roth et al. | |
| 2005/0143135 A1 | 6/2005 | Brems | |
| 2005/0248527 A1 | 11/2005 | Scott | |
| 2005/0266838 A1 | 12/2005 | Kwon et al. | |
| 2006/0271522 A1 | 11/2006 | Scott et al. | |
| 2006/0282791 A1 | 12/2006 | Bogomolov et al. | |
| 2007/0016566 A1 | 1/2007 | Jan et al. | |
| 2007/0061321 A1 * | 3/2007 | Venkataraman | G06F 3/0484 |
| 2007/0076862 A1 | 4/2007 | Chatterjee et al. | |
| 2007/0079239 A1 | 4/2007 | Ghassabian | |
| 2007/0146337 A1 | 6/2007 | Ording et al. | |
| 2007/0198483 A1 | 8/2007 | Li et al. | |
| 2008/0040323 A1 | 2/2008 | Joshi | |
| 2008/0079609 A1 * | 4/2008 | Kallqvist | H04M 1/274558 341/22 |
| 2009/0043915 A1 | 2/2009 | Scott et al. | |

OTHER PUBLICATIONS

Santuci et al., A Hypertabular Visualizer of Query Results, 1977, IEEE, pp. 189-196.

Graefe et al., The Microsoft Relational Engine, 1996, IEEE, pp. 160-161.

Prosecution history of U.S. Pat. No. 6,529,903—U.S. Appl. No. 09/748,833.

Prosecution history of U.S. Pat. No. 6,865,575—U.S. Appl. No. 10/351,772.

* cited by examiner

DETERMINING INTENT OF TEXT ENTRY

CROSS-REFERENCE TO RELATED APPLICATIONS

This application is a continuation application of and claims priority to U.S. application Ser. No. 14/324,343, filed on Jul. 7, 2014, which is a continuation of and claims priority to U.S. application Ser. No. 11/938,692, filed Nov. 12, 2007, the entire contents of each are hereby incorporated by reference.

TECHNICAL FIELD

This document relates to assisting users of computing or communication devices in entering and obtaining information, and more particularly to systems and techniques for assisting a user in obtaining information.

BACKGROUND

As the speed and prevalence of computing devices, including hand-held electronic devices, has increased, the demands of users placed on those devices have also increased. The use of hand-held devices for multiple uses that includes both numerical and alphabetic entry continues to increase. Computing devices, particularly portable devices, may combine numeric and alphabetic data entry using the same input devices, such as the numeric and alphabetic keypad of a telephone.

Increased functionality and number of applications allow a user to use a more complex electronic device, such as a hand-held device or advanced cell phone, for a number of purposes. The more complex electronic devices may be used as a camera, to access weather or traffic reports, phone calls, to access the internet, to send and receive text messages, to check email, gaming, and a variety of other possible uses.

SUMMARY

A computer-implemented method and system are disclosed that provide methods of obtaining information for a user. Information that may be accessed using a hand-held device is indexed with an index value. As an information or search request is made by a user, the index value is used during the search to identify data entries or results matching or near the requested value. Using an index for searching may make the search faster, may require less battery power, and may be used to display a mixture of types of results in response to the same query information entered.

In one approach, information stored in a contact database that is part of a personal information manager (PIM) may be stored and accessed based on a numerical index, or a mapping of numbers on a keypad to one or more alphabetic characters, such as those on a typical keypad.

In one example, an index value is created for all entries in a contact list stored on a hand-held device. When a search is conducted by a user typing in a sequence of digits, the device compares the entered query to the index values, and displays the names of all entries for which the index value matches the sequence number entered. Variously, the matching may be based on a sequence match to the start of a name, to a match anywhere in a name, to a match of names and numbers, to a match of names and email addresses, or other data fields or combinations of fields. In other examples, remote datasets may also be accessed and results displayed based on matching the entered query to a index value.

In one implementation, a computer-implemented method for identifying information entered by a user of an electronic device is described that includes computing an numeric index value for alphanumeric entries in a dataset, receiving input from a keypad on the device, calculating a query value of the entered input, comparing the query value to the index value of entries in the dataset, and displaying items comprising information from entries in the dataset having an index value matching the query value of the received input. The method may further include performing an action using a dataset entry when an item is selected.

The dataset may be part of a disambiguation dictionary for determining alphanumeric entries associated with a numeric input. Variously, the dataset may include information that is stored locally in a hand-held device, or the dataset may include information that is stored remotely that is accessible by the hand-held device, or the dataset may include information that is stored locally in a hand-held device and information that is stored remotely that is accessible by the hand-held device. Variously, the query value may be compared against an index value based on names in the dataset, or the query value may be compared against index values based on names and index values based on numbers in the dataset. Variously, computing an index value for entries in a dataset may include creating different index values based on different fields in an entry in a dataset, such that a single entry has more than one index value, or computing an index value for entries in a dataset may include computing index values for data entries from more than one dataset.

In another implementation, a computer-implemented system is described that includes a data input interface, memory to store index values created for entries in a dataset, a processor to receive input data and compute a query value based on the input data, a request module to identify dataset entries having an index value matching the query value, a response generator to obtain information from identified dataset entries, and a display interface to display the obtained information from the identified dataset entries.

The data input interface may receive input from a keypad. Variously, the dataset may include a single source or database, or may include multiple sources or databases. The multiple databases may include a local source and a remotely accessed source. The dataset may include a remotely accessed source.

In another implementation, a computer-implemented system is described that includes means for receiving input, a processor for calculating a query value of the entered input and comparing the query value to an index value of entries in a dataset, and means for displaying information from dataset entries having an index value matching or closest to the query value of the received input.

The means for receiving input may include a keypad, button, touchscreen, microphone, scanner, or mouse or other pointing device. The dataset may include entries from multiple sources or databases. The dataset may include entries from local and remotely accessed sources or databases.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1A:
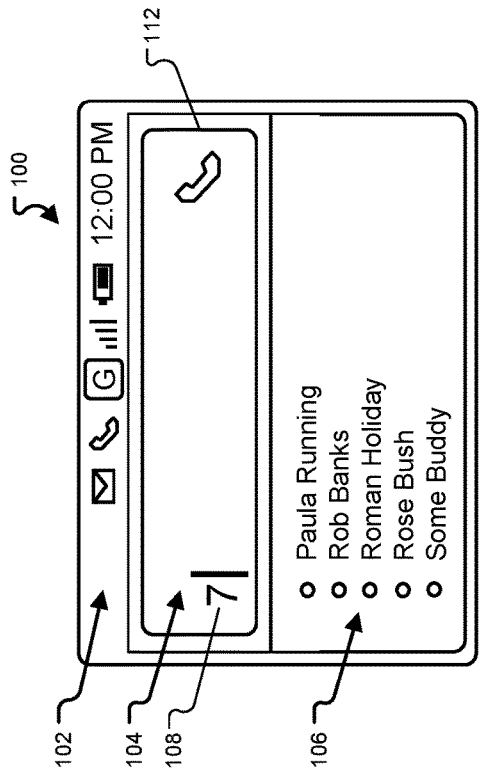
FIG. 1A-1F show a series of exemplary screenshots for determining the intent of text entry.

Mobile devices, including those with smaller form factors, may require varying and often limited types of keyboards, keypads, or input devices for entering information. However, the data entered into a device may be alphanumeric (and not simply numeric) in nature. Some data entry systems may use the same keys to represent both letters and numbers, and hence data entry may be initially ambiguous in nature—often requiring multiple taps of a key to determine a user's intent. In addition, information managed by a device may be stored in an alphanumeric format.

In one implementation, the alphanumeric information presented in a display area may be stored in an indexed or key mapped format, with alphabetic characters having corresponding numeric values. In some implementations, storing an index can optimize the speed and performance of finding relevant information for a search query. For example, using an index to represent an alphanumeric set of characters can provide a mechanism for a system to avoid searching for, or analyzing each possible alphanumeric character, which can take an increased amount of computer processing time and computing power.

This may enable information entered using an alphanumeric keypad to be converted to a numeric information index value for efficient storage and retrieval. For example, a contact name entered using the numeric keypad as "john doe" can be stored in an indexed format with a corresponding numeric index value of "5646#363". The numeric values associated with the characters "john doe" are those depicted on a typical keypad association (such as illustrated in FIG. 3B). The conversion of information to indexed values can occur while entering information, as a function or process within a software application such as an email or online chat application, or when performing other various processes or tasks.

FIG. 1 shows a series of exemplary screenshots for determining the intent of text entry. FIG. 1A though FIG. 1D show one example display sequence for determining the intent of text entry. In this example, the display 100 includes a menu area 102; a data entry area 104; and a display area 106. The menu area 102 may provide a visual status of a hardware device, operating system, phone system or other system, and may include icons as described in more detail later in this document for FIG. 3A and FIG. 3B. The data entry area 104 may allow for the display of entered or inferred alphanumeric information from a keyboard, keypad, or various other input devices. The display area 106 may present information such as names or phone numbers stored in a contact database. The display area 106 may also present information during highlighting and selecting data as a response to the information entered in the data entry area 104. For example, in FIG. 1A a list of names from a stored contact database is presented in the display area 106, with each name presented alphabetically. One process for matching is described in more detail with reference to FIG. 2.

Figure 1B:
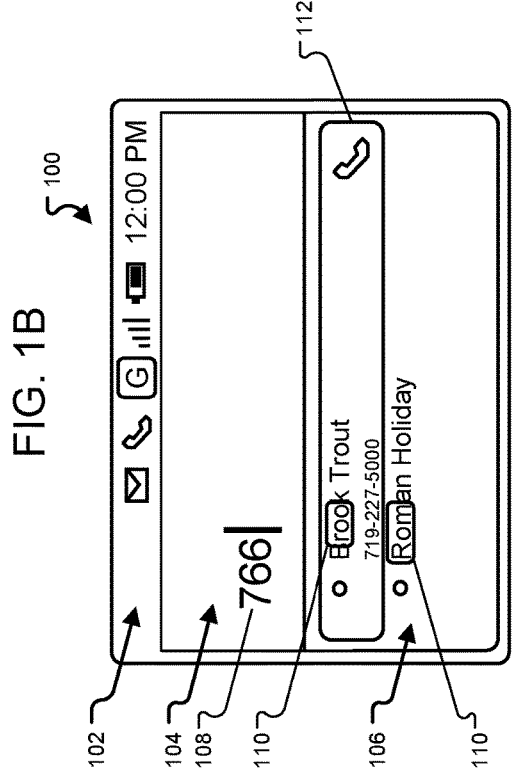

FIG. 1B shows the display 100 as shown in FIG. 1A, following the entry of information 108, as presented in the data entry area 104. In this example, the data entry area 104 demonstrates that information 108 has been entered by some input method. Data entered in the data entry area 104 may correspond to stored information that is presented in the display area 106. Possible matches to data entered in the data entry area 104 may be presented in the display area 106. Matches may include complete matches to indexed values or mapped data, or matches to subsets of indexed values or mapped data. In this example, a list of names from a stored contact database is presented in the display area 106, with each presented name beginning with either "p", "q", "r", or "s" as a possible match to the corresponding "7" entered in the data entry area 104. In this example, the numeric value "7" is an indexed value for the alphabetic characters "p", "q", "r", and "s" as depicted in FIG. 3B, on the "7" key 377. Examples of datasets that may be used for matching entries may include a list of previously called phone numbers in a recent call log, using a contact database, using a remote file or database, using a dictionary of commonly used terms (which may be periodically updated to reflect current usage such as usage of terms presented to a search engine), or other source or combination of sources.

Figure 1C:
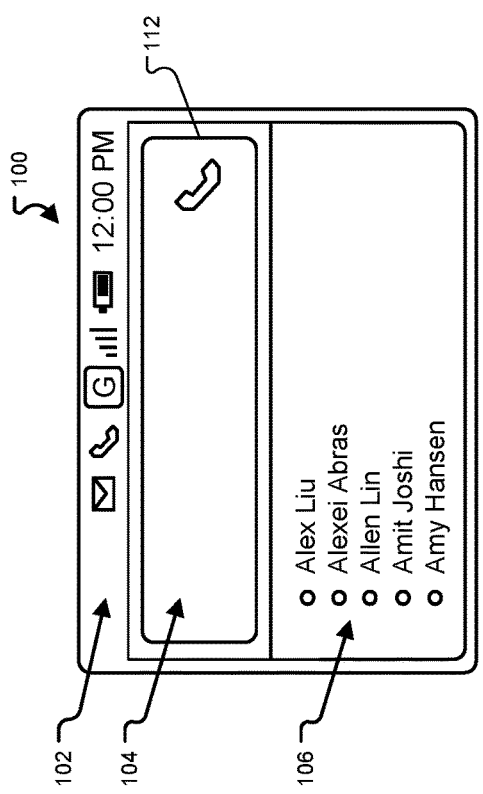

FIG. 1C includes the menu area 102, data entry area 104, and display area 106 as shown in FIG. 1A and FIG. 1B, and shows another example display screen for determining the intent of text entry. In this example, the data entry area 104 includes additional information 108 entered by some input method similar to that described previously for FIG. 1B. The information entered may correspond to specific stored information. Possible matches to data entered in the data entry area 104 may be presented in the display area 106. Matches may include complete matches to indexed or mapped data, or matches to subsets of indexed or mapped data. Complete matches, subset matches, or combinations thereof may be presented in the display area 106 with visual markings 110 to indicate matching information.

Figure 1D:
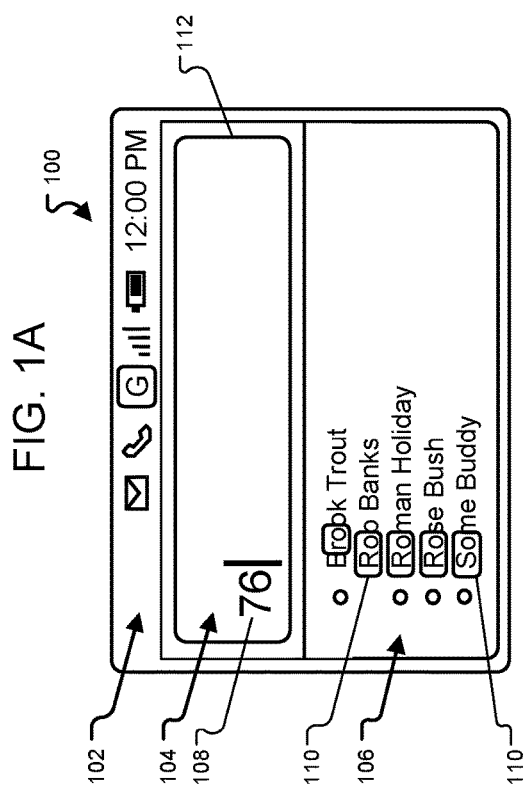

As shown in display area 106, the displayed results change as the data entered in the data entry area 104 changes, or is added upon. FIG. 1D includes the menu area 102, data entry area 104, and display area 106 as shown in FIG. 1A, FIG. 1B, and FIG. 1C, and shows another example display screen for determining the intent of text entry. The example display may include a selection indicator 112. The selection indicator 112 may provide a visual indication for which item in the display area 106 has focus. As demonstrated in the progression from FIG. 1A to FIG. 1D, initially the selection indicator 112 is emphasizing the data entry area 104. As data is entered in the data entry area 104, possible matches to the entered data may be presented in the display area 106. Matches may include complete matches to indexed or mapped data, or matches to subsets of indexed or mapped data. In this example, the information entered in the data entry area 104 corresponds to one or more pieces of stored information, and is presented in the display area 106 with visual markings 110. As shown in display area 106, the displayed results may be identified by matching at the start of an entry (such as the start of a word), or by matching an index sequence that appears anywhere in the entry (such as the middle of a word). The displayed results shown in FIG. 1D are matched by matching the sequence anywhere in the entry, as shown by visual markings 110.

In addition, and as indicated by this example, when a displayed result is selected (as shown by the selection indicator 112), the displayed entry may be expanded to include and display additional information, such as telephone number(s), address, other contact information, or combinations and/or subsets thereof. This may be accomplished by changing the focus of the selection indicator 112, which may shift from the data entry area 104 to one or more items presented in the display area 106, as demonstrated by the placement of the selection indicator 112 in FIG. 1D.

Figure 1F:
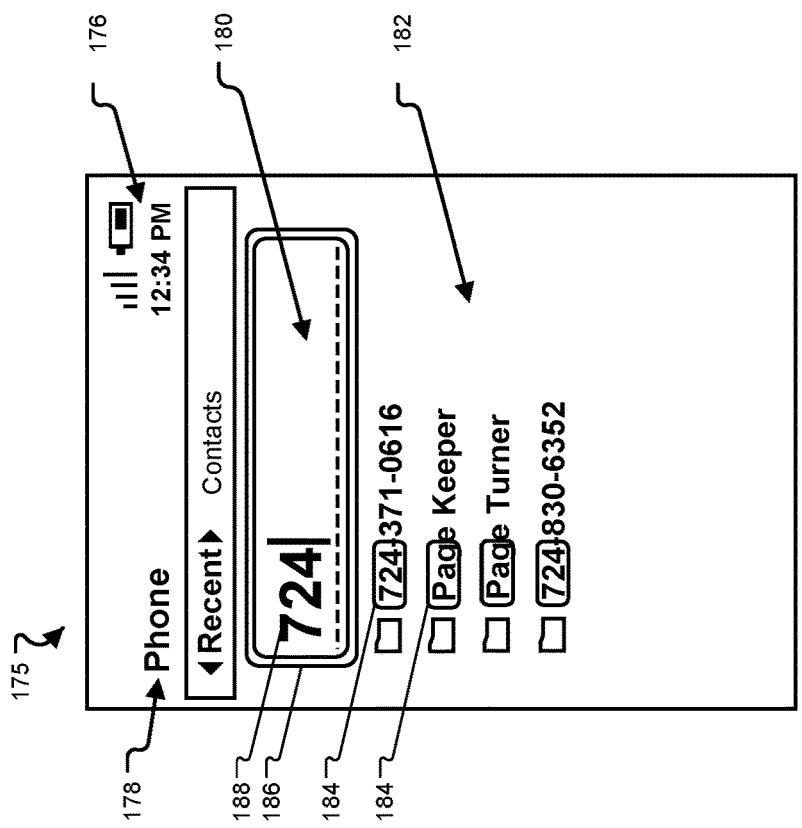
Figure 1E:
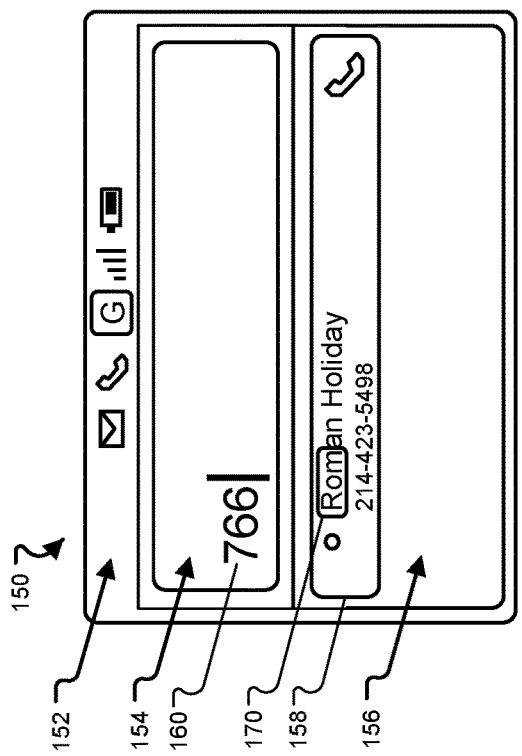

FIG. 1E shows another example display for determining the intent of text entry. FIG. 1E includes the menu area 152, data entry area 154, and display area 156 similar to those shown in FIGS. 1A-D. As described previously for FIGS. 1A-D, a selection indicator 158 may provide a visual indication for which item in the display area 156 currently has focus. As data has been entered in the data entry area 154 which can be matched to one or more corresponding information items, the possible matches to the entered data are presented in the display area 156.

The focus of the selection indicator 158 may shift from the data entry area 154 to one or more items presented in the display area 156, as demonstrated by the placement of the selection indicator 158 in FIG. 1E. In this example, the displayed results are displayed by matching the entered information sequence at the start of an entry, as shown by visual marking 170. Thus, based on the data entered as "766", the first three characters of the contact record for "Roman Holiday" are found to match, based on the use of a numeric index matching "7" to "R", "6" to "O", and "6" to "M". The placement of the selection indicator 158 as shown in FIG. 1E expands the information displayed to include the telephone number of the displayed matching entry.

FIG. 1F shows another example display for determining the intent of text entry. Similarly to FIGS. 1A-D and FIG. 1E, the example display 175 includes a menu area 176; an application identification area 178; a data entry area 180; a display area 182; visual markings 184, and a selection indicator 186. In this example, information 188 entered in the data entry area 180 is shown to be numeric information. The information corresponds to one or more pieces of stored information, and is presented in the display area 182 with visual markings 184. As indicated by this example, the information presented with visual markings 184 can include telephone records, contact records, or combinations and/or subsets thereof. The information 188 entered in the data entry area 180 may be found to match subsets or complete phone numbers of one or more phone numbers, and may also be found to match the indexed character subsets or complete contact names.

In this example, the displayed results are selected for display by matching the values of the entered information sequence to the index values at the start of either a name or number entry. The possible matches are shown in the display area 182 with visual markings 184, which may be used to help identify possible matches shown in the display area 182. In this example, the indexed values of "724" match "Pag" in the contact name "Page Turner" and "Page Keeper", as well as matching the digits "724" in the displayed phone numbers. The indexed values for these entries start with a sequence that corresponds to the data entered as "724."

Figure 2:
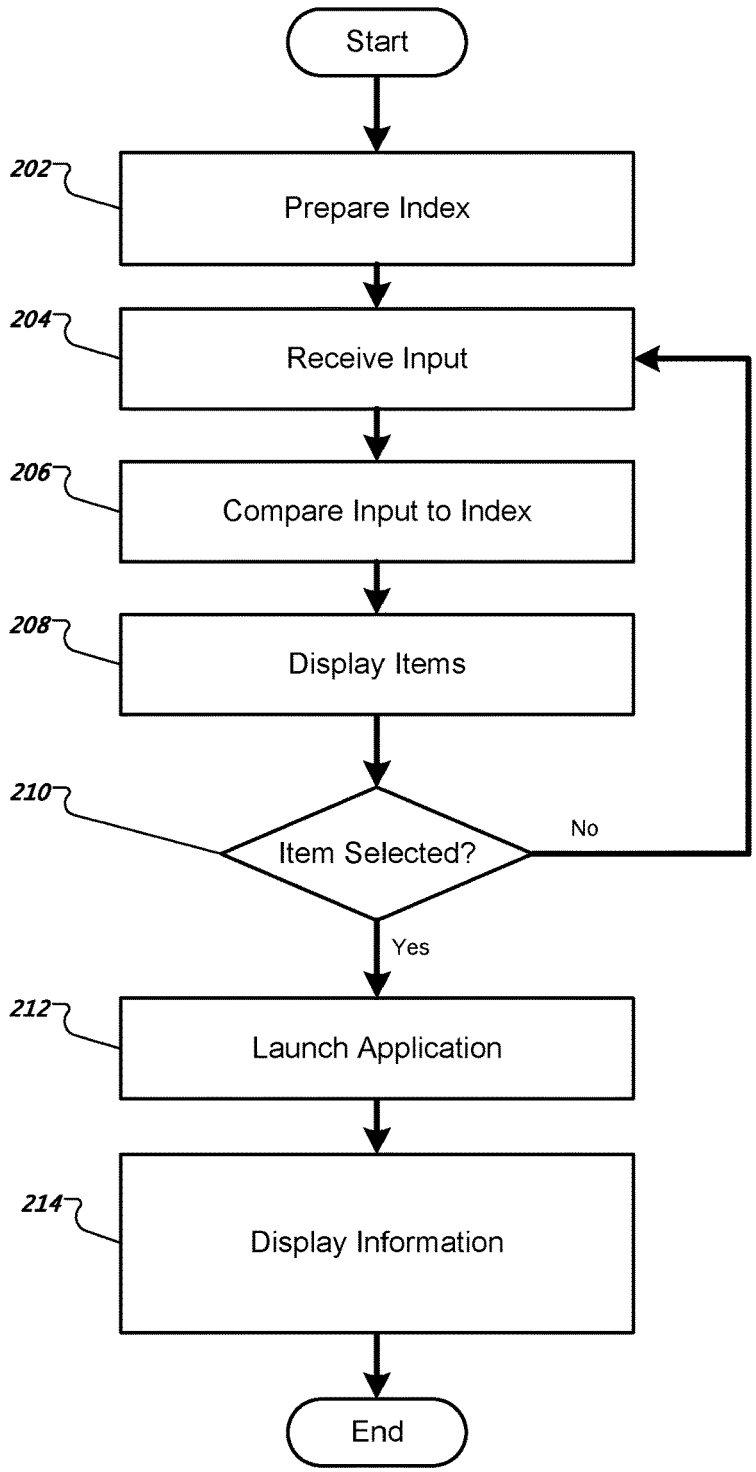
FIG. 2 is a flow diagram of an example process for preparing, selecting, and displaying information on a device.

FIG. 2 is a flow diagram of an example flow process 200 for preparing, selecting, and displaying information on a device. The process 200 begins by preparing an index for the information entered in step 202. Indexing may provide for more efficient and speedy searching of information on various devices, and particularly those with limited input capabilities. The use of indexing may require less battery power for searches, and may be used to display a mixture of types of results in response to the same query information entered. Indexing can be done on information present on the device, on information that may be accessed by the device, or on a combination of types. An index can include information indexed from a single database or other information source, or may be an index of information from multiple sources. As one example, an index may be based on information located only on a local contact list present on a user's mobile device. Example of other potential sources, an index may be based on information present in a call log on a user's mobile device, a contact list on a user's mobile device, a user's email list stored on a remote computer that is accessed remotely, and a company employee list that is accessed remotely. A large number of other combinations and alternatives are possible.

The process of indexing creates a representation, such as an index value, that corresponds to identified information in the specified sources. As depicted and described for FIGS. 1A-1F, indexing may be used to map one or more alphabetical characters to a single numeric value. In one implementation, an index may be created by creating a representation for names stored in a local contact list by mapping letters present in the contact name field to the corresponding number present on a telephone keypad for each letter. For example, the name "Roman Holiday" might be assigned the number "76626#4654329." In this example, the symbol # might stand for a space, or any other entry. Alternatively, the space in the name (#) might be ignored in preparing the index. Storing a list of contact names by indexing them to their corresponding numeric values, as depicted and described for FIG. 3B and shown on the keypad 352, may provide more efficient searching and retrieval of information, and may consume less power than running repeated searches based on text entry. For example, rather than requiring an updated search as each entry occurs in the text field, pre-indexing the information allows a device to merely display information matching the text entry.

Indexing may be performed and managed by a software application, as part of another application, as part of a data entry process, or otherwise. In one implementation, indexes can be created when data is entered via keyboard input, or downloading from other networked systems (e.g. information synching by physical BLUETOOTH or WIFI connection to another device, to a computer or network). Indexes may be stored in a software database, flash memory, file storage, or combinations thereof. Indexes may be based on one or more datasets, databases, or sources of information.

In step 204, input information is received by the device. The input information may be received from a text entry, by a query or lookup request, or from another source. For example, the input may be received from numeric, alphabetic, or ambiguous text entry from a keypad. As another example, the input may be received as a query based on information contained in a received text message or email message. Other input sources are also possible. The input information is converted to an input or query index value representation by the same procedure that is used to create the index value. Thus, for example, an entry of "A2D" and an entry of "223" will both be converted to an input index value representation of "223," which will be used for comparison and matching against the index values of entries in the source or sources of data. This type of entry may be received when using a device, such as that shown in FIG. 3A, that includes a data entry pad that include separate number and alphabetic keys. Devices using a typical keypad, such as shown in FIG. 3B, generally will have a direct conversion of the digits entered to the index value representation of the entry.

In step 206, input received may be compared to index values stored in an index described earlier in this document. As an example, a numeric value entered into the data entry area 104, FIGS. 1A-D may be compared to stored information such as a list of phone numbers, or compared to alphabetic representations of the numeric values on a keypad 352 (depicted and described for FIG. 3B).

The matching results from the comparison of input information to the Index in step 206 are then displayed in step 208. As depicted and described in FIGS. 1A-D, the display area 106 of the example device can be used to display items in step 208. In step 208, information can be presented, for example, with additional visual markings (FIGS. 1A-D, component 110), with a selection indicator 112, FIG. 1D, and combinations thereof. In the example shown in FIG. 1D, the list of possible matching information can be presented with one or more contact names and optionally show additional information such as a phone number. These results may be displayed following entry of a single digit, and the results may be updated following entry of additional data.

In step 210, the process checks whether a selection has been made from the displayed items. In one implementation, additional displayed information can be obtained about a displayed record by highlighting a possible selection using the selection indicator 112 shown in example FIG. 1D. If no selection is made, the process 200 returns to receive input step 204 for entry of additional or different information. In one implementation, the display list is updated following entry of each additional digit in the entry until a selection is made.

Optionally, if an item is selected in step 210, the process can launch an application in step 212 based on the displayed entry selected at step 210. For example, selecting information in step 210 may result in the change from a contact searching function to the launch of a phone application at step 212 based on the selection of a name or phone number in step 210. In some implementations, an expanded display application can launch when an item is selected. For example, a complete contact record including name, phone number, mailing address, email address, business information, or combinations thereof may be displayed when a name or number is selected. Other examples of displaying information in step 214 may include: launching an email application screen to compose a message to a selected contact, launching a text messaging screen to compose a text message to a selected contact, or launching an internet connection screen showing a website associated with a contact selected in step 210.

Figure 3A:
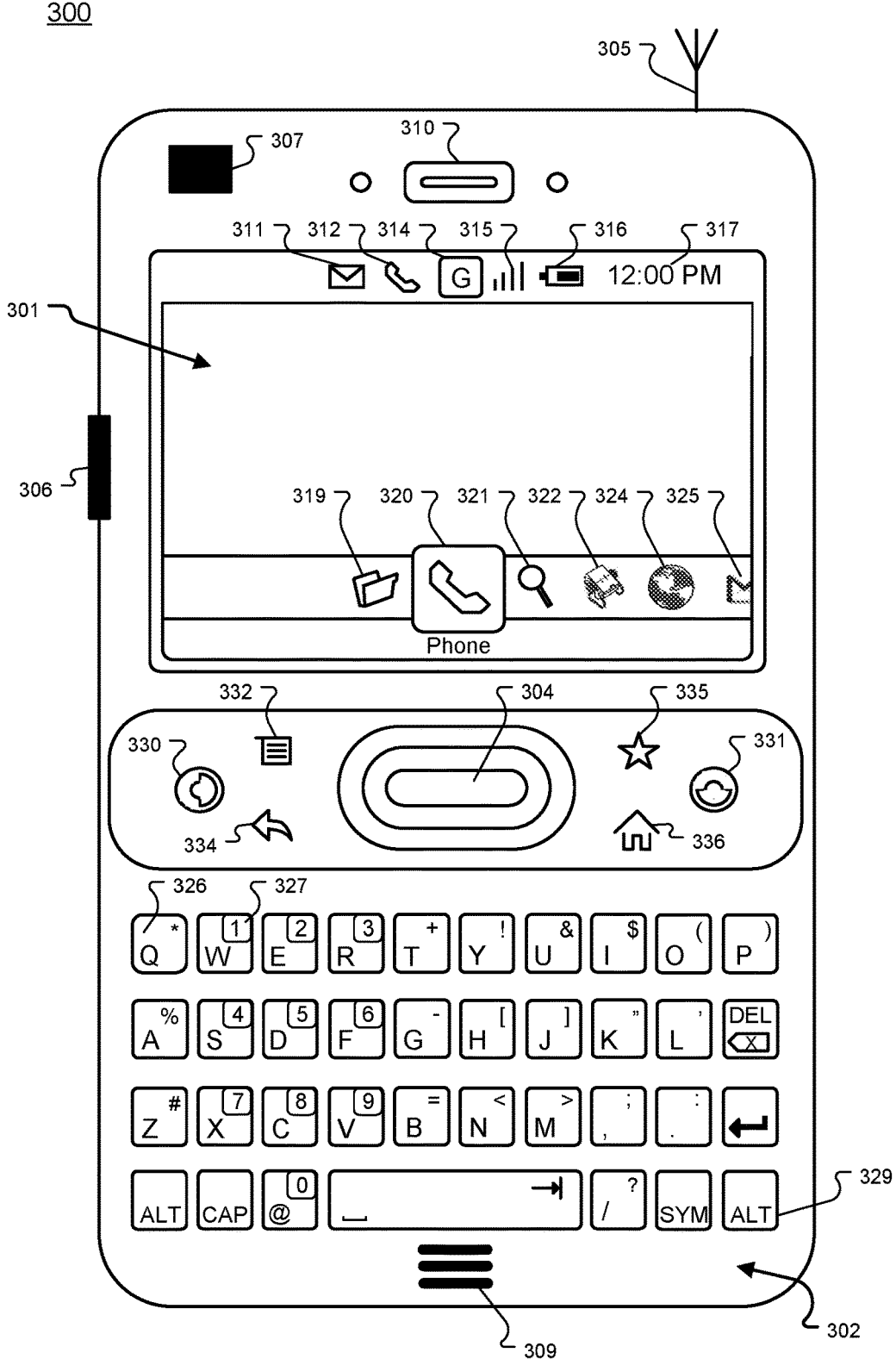
FIG. 3A-3B are a number of schematic representations of exemplary mobile devices that implement embodiments determining the intent of text entry described herein.
Figure 3B:
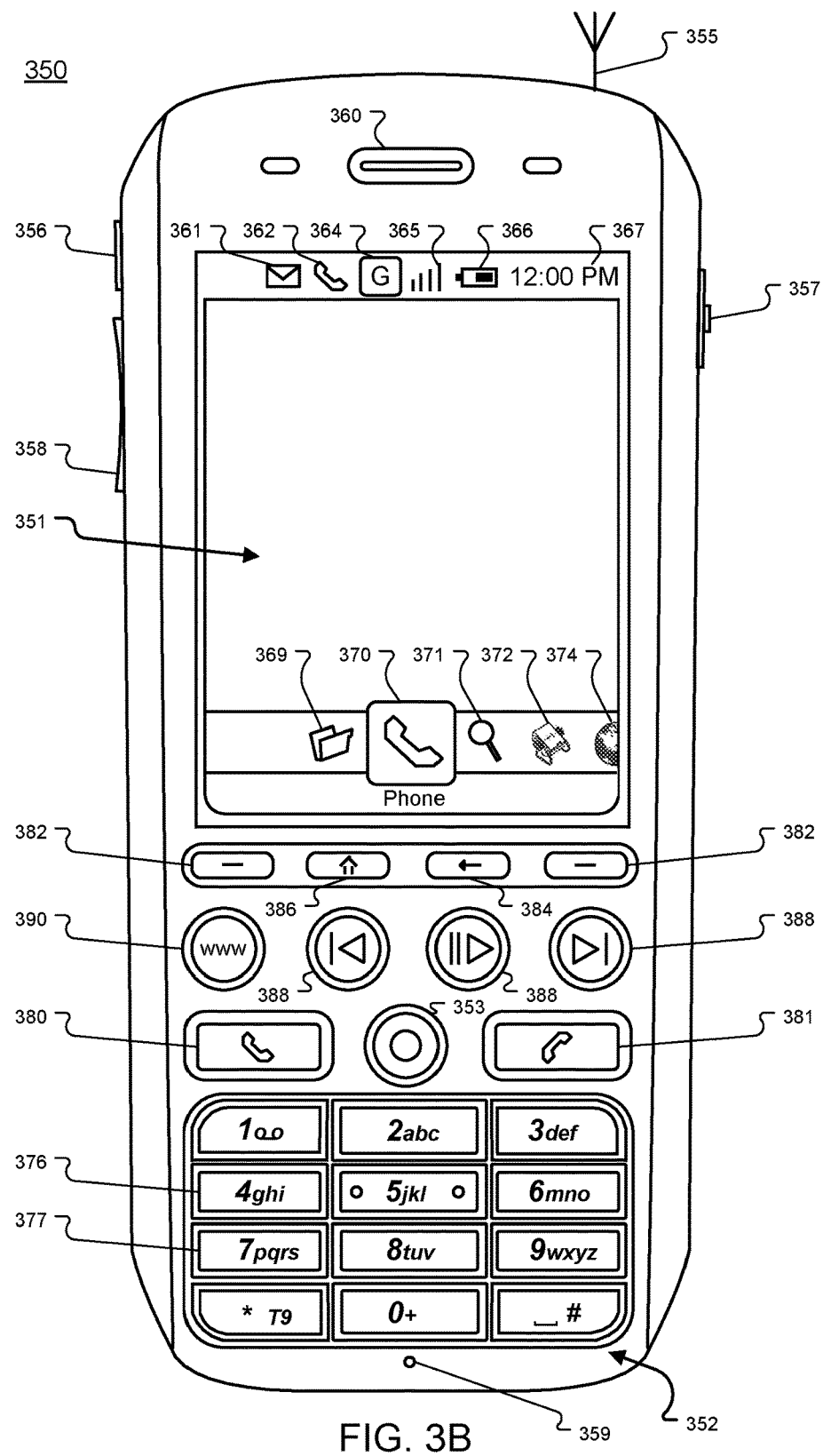

Referring now to FIG. 3A, the exterior appearance of an exemplary device 300 that implements determining the intent of text entry is illustrated. Briefly, and among other things, the device 300 includes a processor configured to determine the intent of text entry upon request of a user of the mobile device.

In more detail, the hardware environment of the device 300 includes a display 301 for displaying text, images, and video to a user; a keyboard 302 for entering text data and user commands into the device 300; a pointing device 304 for pointing, selecting, and adjusting objects displayed on the display 301; an antenna 305; a network connection 306; a camera 307; a microphone 309; and a speaker 310. Although the device 300 includes an external antenna, it is anticipated that the device 300 can include an internal antenna, which is not visible to the user.

The display 301 can display video, graphics, images, and text that make up the user interface for the software applications used by the device 300, and the operating system programs used to operate the device 300. Among the possible elements that may be displayed on the display 301 are a new mail indicator 311 that alerts a user to the presence of a new message; an active call indicator 312 that indicates that a telephone call is being received, placed, or is occurring; a data standard indicator 314 that indicates the data standard currently being used by the device 300 to transmit and receive data; a signal strength indicator 315 that indicates a measurement of the strength of a signal received by via the antenna 305, such as by using signal strength bars; a battery life indicator 316 that indicates a measurement of the remaining battery life; or a clock 317 that outputs the current time.

The display 301 may also show application icons representing various applications available to the user, such as a web browser application icon 319, a phone application icon 320, a search application icon 321, a contacts application icon 322, a mapping application icon 324, an email application icon 325, or other application icons. In one example implementation, the display 301 is a quarter video graphics array (QVGA) thin film transistor (TFT) liquid crystal display (LCD), capable of 16-bit or better color.

A user uses the keyboard (or "keypad") 302 to enter commands and data to operate and control the operating system and applications that provide for determining the intent of text entry. The keyboard 302 includes standard keyboard buttons or keys associated with alphanumeric characters, such as keys 326 and 327 that are associated with the alphanumeric characters "Q" and "W" when selected alone, or are associated with the characters "*" and "1" when pressed in combination with key 329. A single key may also be associated with special characters or functions, including unlabeled functions, based upon the state of the operating system or applications invoked by the operating system. For example, when an application calls for the input of a numeric character, a selection of the key 327 alone may cause a "1" to be input.

In addition to keys traditionally associated with an alphanumeric keypad, the keyboard 302 also includes other special function keys, such as an establish call key 330 that causes a received call to be answered or a new call to be originated; a terminate call key 331 that causes the termination of an active call; a drop down menu key 332 that causes a menu to appear within the display 301; a backwards navigation key 334 that causes a previously accessed network address to be accessed again; a favorites key 335 that causes an active web page to be placed in a bookmarks folder of favorite sites, or causes a bookmarks folder to appear; a home page key 336 that causes an application invoked on the device 300 to navigate to a predetermined network address; or other keys that provide for multiple-way navigation, application selection, and power and volume control.

The user uses the pointing device 304 to select and adjust graphics and text objects displayed on the display 301 as part of the interaction with and control of the device 300 and the applications invoked on the device 300. The pointing device 304 is any appropriate type of pointing device, and may be a joystick, a trackball, a touch-pad, a camera, a voice input device, a touch screen device implemented in combination with the display 301, or any other input device.

The antenna 305, which can be an external antenna or an internal antenna, is a directional or omni-directional antenna used for the transmission and reception of radiofrequency (RF) signals that implement point-to-point radio communication, wireless local area network (LAN) communication, or location determination. The antenna 305 may facilitate point-to-point radio communication using the Specialized Mobile Radio (SMR), cellular, or Personal Communication Service (PCS) frequency bands, and may implement the transmission of data using any number or data standards. For example, the antenna 305 may allow data to be transmitted between the device 300 and a base station using technologies such as Wireless Broadband (WiBro), Worldwide Interoperability for Microwave ACCess (WiMAX), 3GPP Long Term Evolution (LTE), Ultra Mobile Broadband (UMB), High Performance Radio Metropolitan Network (HIPERMAN), iBurst or High Capacity Spatial Division Multiple Access (HC-SDMA), High Speed OFDM Packet Access (HSOPA), High-Speed Packet Access (HSPA), HSPA Evolution, HSPA+, High Speed Upload Packet Access (HSUPA), High Speed Downlink Packet Access (HSDPA), Generic Access Network (GAN), Time Division-Synchronous Code Division Multiple Access (TD-SCDMA), Evolution-Data Optimized (or Evolution-Data Only)(EVDO), Time Division-Code Division Multiple Access (TD-CDMA), Freedom Of Mobile Multimedia Access (FOMA), Universal Mobile Telecommunications System (UMTS), Wideband Code Division Multiple Access (W-CDMA), Enhanced Data rates for GSM Evolution (EDGE), Enhanced GPRS (EGPRS), Code Division Multiple Access-2000 (CDMA2000), Wideband Integrated Dispatch Enhanced Network (WiDEN), High-Speed Circuit-Switched Data (HSCSD), General Packet Radio Service (GPRS), Personal Handy-Phone System (PHS), Circuit Switched Data (CSD), Personal Digital Cellular (PDC), CDMAone, Digital Advanced Mobile Phone System (D-AMPS), Integrated Digital Enhanced Network (IDEN), Global System for Mobile communications (GSM), DataTAC, Mobitex, Cellular Digital Packet Data (CDPD), Hicap, Advanced Mobile Phone System (AMPS), Nordic Mobile Phone (NMP), Autoradiopuhelin (ARP), Autotel or Public Automated Land Mobile (PALM), Mobiltelefonisystem D (MTD), Offentlig Landmobil Telefoni (OLT), Advanced Mobile Telephone System (AMTS), Improved Mobile Telephone Service (IMTS), Mobile Telephone System (MTS), Push-To-Talk (PTT), or other technologies. Communication via W-CDMA, HSUPA, GSM, GPRS, and EDGE networks may occur, for example, using a QUALCOMM MSM7200A chipset with an QUALCOMM RTR6285™ transceiver and PM7540™ power management circuit.

The wireless or wired computer network connection 306 may be a modem connection, a local-area network (LAN) connection including the Ethernet, or a broadband wide-area network (WAN) connection such as a digital subscriber line (DSL), cable high-speed internet connection, dial-up connection, T-1 line, T-3 line, fiber optic connection, or satellite connection. The network connection 306 may connect to a LAN network, a corporate or government WAN network, the Internet, a telephone network, or other network. The network connection 306 uses a wired or wireless connector. Example wireless connectors include, for example, an INFRARED DATA ASSOCIATION (IrDA) wireless connector, a Wi-Fi wireless connector, an optical wireless connector, an INSTITUTE OF ELECTRICAL AND ELECTRONICS ENGINEERS (IEEE) Standard 802.11 wireless connector, a BLUETOOTH wireless connector (such as a BLUETOOTH version 1.2 or 3.0 connector), a near field communications (NFC) connector, an orthogonal frequency division multiplexing (OFDM) ultra wide band (UWB) wireless connector, a time-modulated ultra wide band (TM-UWB) wireless connector, or other wireless connector. Example wired connectors include, for example, a IEEE-1394 FIREWIRE connector, a Universal Serial Bus (USB) connector (including a mini-B USB interface connector), a serial port connector, a parallel port connector, or other wired connector. In another implementation, the functions of the network connection 306 and the antenna 305 are integrated into a single component.

The camera 307 allows the device 300 to capture digital images, and may be a scanner, a digital still camera, a digital video camera, other digital input device. In one example implementation, the camera 307 is a 3 mega-pixel (MP) camera that utilizes a complementary metal-oxide semiconductor (CMOS).

The microphone 309 allows the device 300 to capture sound, and may be an omni-directional microphone, a unidirectional microphone, a bi-directional microphone, a shotgun microphone, or other type apparatus that converts sound to an electrical signal. The microphone 309 may be used to capture sound generated by a user, for example when the user is speaking to another user during a telephone call via the device 300. Conversely, the speaker 310 allows the device to convert an electrical signal into sound, such a a voice from another user generated by a telephone application program, or a ring tone generated from a ring tone application program. Furthermore, although the device 300 is illustrated in FIG. 3 as a handheld device, in further implementations the device 300 may be a laptop, a workstation, a midrange computer, a mainframe, an embedded system, telephone, desktop PC, a tablet computer, a PDA, or other type of computing device.

Referring now to FIG. 3B, the exterior appearance of another exemplary device 350 that implements determining the intent of text entry is illustrated. Briefly, and among other things, the device 350 includes a processor configured to determine the intent of text entry upon request of a user of the mobile device.

In more detail, the hardware environment of the device 350 includes a display 351 for displaying text, images, and video to a user; a keyboard 352 for entering text or numeric data and user commands into the device 350; a pointing device 354 for pointing, selecting, and adjusting objects displayed on the display 351; an antenna 355; a network connection 356; a power switch 357; a volume control switch 358; a microphone 359; and a speaker 360. Although not shown in FIG. 3B, a camera as depicted in FIG. 3A, component 307 may be included in the hardware environment. Moreover, although the device 350 shows an external antenna, it is anticipated that the device 350 may instead include an internal antenna, which is not visible to the user.

The display 351 displays video, graphics, images, and text that make up the user interface for the software applications used by the device 350, and the operating system programs used to operate the device 350. Among the possible elements that may be displayed on the display 351 are a new mail indicator 361 that alerts a user to the presence of a new message; an active call indicator 362 that indicates that a telephone call is being received, placed, or is occurring; a data standard indicator 364 that indicates the data standard currently being used by the device 350 to transmit and receive data; a signal strength indicator 365 that indicates a measurement of the strength of a signal received by via the antenna 355, such as by using signal strength bars; a battery life indicator 366 that indicates a measurement of the remaining battery life; or a clock 367 that outputs the current time.

The display 351 may also show application icons representing various applications available to the user, such as a web browser application icon 369, a phone application icon 370, a search application icon 371, a contacts application icon 372, a mapping application icon 374, an email application icon as depicted in FIG. 3A, application icon 375, or other application icons. In one example implementation, the display 351 is a quarter video graphics array (QVGA) thin film transistor (TFT) liquid crystal display (LCD), capable of 16-bit or better color.

A user uses the keyboard (or "keypad") 352 to enter commands and data to operate and control the operating system and applications that provide for automatic cropping of an image. The keyboard 352 includes standard keyboard buttons or keys associated with alphanumeric characters, such as keys 376 and 377 that are associated with the numeric characters "4" and "7" when selected alone, or are associated with the characters "g", "h", or "i" and "p", "q", "r", or "s" when pressed in succession. A single key may also be associated with special characters or functions, including unlabeled functions, based upon the state of the operating system or applications invoked by the operating system. For example, when an application calls for the input of a alphanumeric character, a selection of the key 377 alone may cause a "g", "h", or "i" to be input.

In addition to keys traditionally associated with an alphanumeric keypad, the keyboard 352 also includes other special function keys, such as an establish call key 380 that causes a received call to be answered or a new call to be originated; a terminate call key 381 that causes the termination of an active call; keys which may be programmable for launching applications or performing other functions 382; a backwards navigation key 384 that causes a previously accessed network address to be accessed again; a home page key 386 that causes an application invoked on the device 350 to navigate to a predetermined network address; one or more keys for media control 388; a key to launch an internet browser application 390; or other keys that provide for multiple-way navigation, application selection, and power and volume control.

The user uses the pointing device 354 to select and adjust graphics and text objects displayed on the display 351 as part of the interaction with and control of the device 350 and the applications invoked on the device 350. The pointing device 354 is any appropriate type of pointing device, and may be a joystick, a trackball, a touch-pad, a camera, a voice input device, a touch screen device implemented in combination with the display 351, or any other input device.

The antenna 355, which can be an external antenna or an internal antenna, is a directional or omni-directional antenna used for the transmission and reception of radiofrequency (RF) signals that implement point-to-point radio communication, wireless local area network (LAN) communication, or location determination. The antenna 355 may facilitate point-to-point radio communication using the Specialized Mobile Radio (SMR), cellular, or Personal Communication Service (PCS) frequency bands, and may implement the transmission of data using any number or data standards. For example, the antenna 355 may allow data to be transmitted between the device 350 and a base station using technologies including those described previously for FIG. 3A.

The wireless or wired computer network connection 356 may be a connection including the those described previously for FIG. 3A. In another implementation, the functions of the network connection 306 and the antenna 355 are integrated into a single component.

The microphone 359 allows the device 350 to capture sound, and may be an omni-directional microphone, a unidirectional microphone, a bi-directional microphone, a shotgun microphone, or other type apparatus that converts sound to an electrical signal. The microphone 359 may be used to capture sound generated by a user, for example when the user is speaking to another user during a telephone call via the device 350. Conversely, the speaker 360 allows the device to convert an electrical signal into sound, such a a voice from another user generated by a telephone application program, or a ring tone generated from a ring tone application program. Furthermore, although the device 350 is illustrated in FIG. 3B as a handheld device, in further implementations the device 350 may be a laptop, a workstation, a midrange computer, a mainframe, an embedded system, telephone, desktop PC, a tablet computer, a PDA, or other type of computing device.

Figure 4:
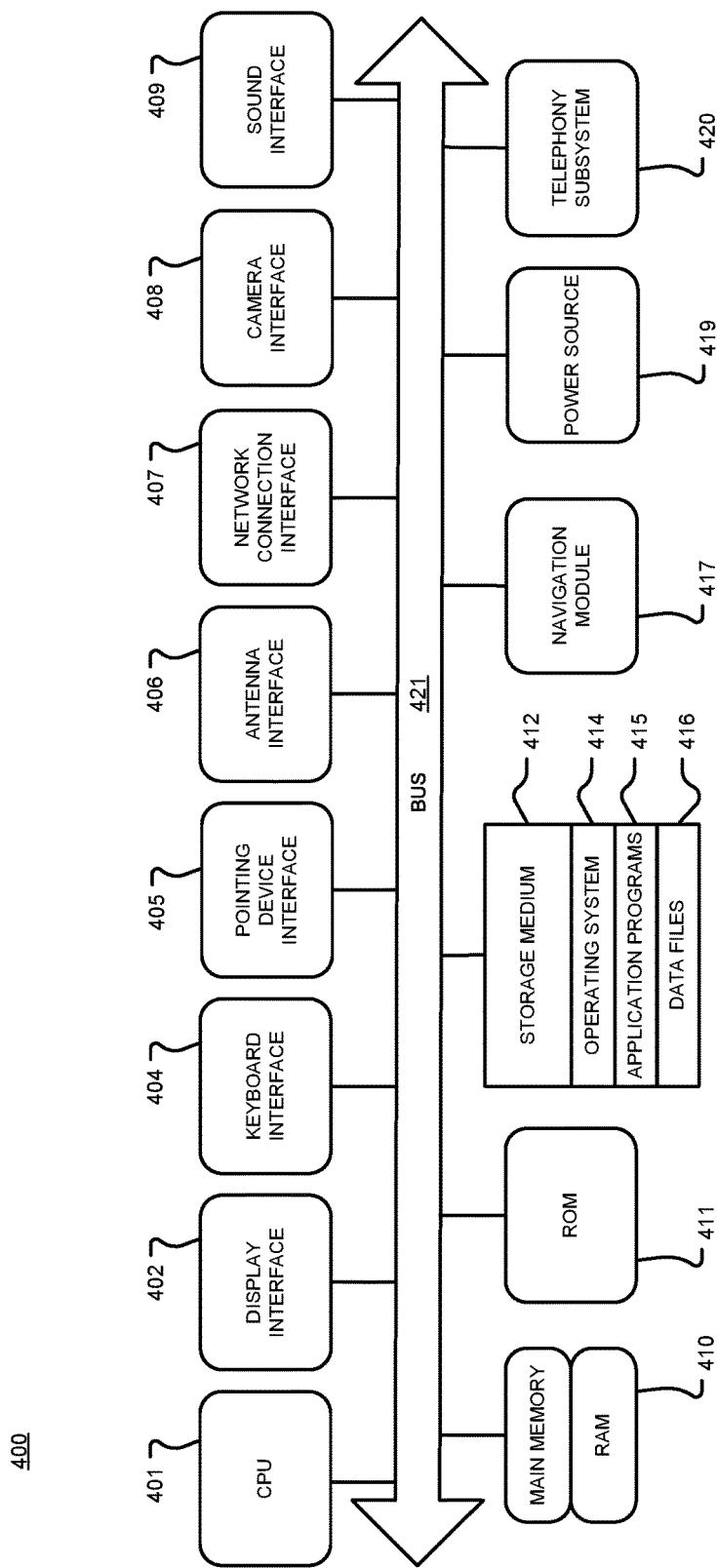
FIG. 4 is a block diagram illustrating the internal architecture of the devices depicted in FIGS. 3A-3B.

FIG. 4 is a block diagram illustrating an exemplary internal architecture 400 of the device 300 or 350. The architecture includes a central processing unit (CPU) 401 where the computer instructions that comprise an operating system or an application are processed; a display interface 402 that provides a communication interface and processing functions for rendering video, graphics, images, and texts on the display 301, provides a set of built-in controls (such as buttons, text and lists), and supports diverse screen sizes; a keyboard interface 404 that provides a communication interface to the keyboard 302; a pointing device interface 405 that provides a communication interface to the pointing device 304; an antenna interface 406 that provides a communication interface to the antenna 305; a network connection interface 407 that provides a communication interface to a network over the computer network connection 306; a camera interface 408 that provides a communication interface and processing functions for capturing digital images from the camera 307; a sound interface 409 that provides a communication interface for converting sound into electrical signals using the microphone 309 and for converting electrical signals into sound using the speaker 310; a random access memory (RAM) 410 where computer instructions and data are stored in a volatile memory device for processing by the CPU 401; a read-only memory (ROM) 411 where invariant low-level systems code or data for basic system functions such as basic input and output (I/O), startup, or reception of keystrokes from the keyboard 302 are stored in a non-volatile memory device; a storage medium 412 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files that comprise an operating system 414, application programs 415 (including, for example, a web browser application, a widget or gadget engine, and or other applications, as necessary) and data files 416 are stored; a navigation module 417 that provides a real-world or relative position or geographic location of the device 300; a power source 419 that provides an appropriate alternating current (AC) or direct current (DC) to power components; and a telephony subsystem 420 that allows the device 300 to transmit and receive sound over a telephone network. The constituent devices and the CPU 401 communicate with each other over a bus 421.

The CPU 401 is one of a number of computer processors, including. In one arrangement, the computer CPU 401 is more than one processing unit. The RAM 410 interfaces with the computer bus 421 so as to provide quick RAM storage to the CPU 401 during the execution of software programs such as the operating system application programs, and device drivers. More specifically, the CPU 401 loads computer-executable process steps from the storage medium 412 or other media into a field of the RAM 410 in order to execute software programs. Data is stored in the RAM 410, where the data is accessed by the computer CPU 401 during execution. In one example configuration, the device 300 includes at least 128 MB of RAM, and 256 MB of flash memory.

The storage medium 412 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow the device 300 to access computer-executable process steps, application programs and the like, stored on removable and non-removable memory media, to off-load data from the device 300, or to upload data onto the device 300.

A computer program product is tangibly embodied in storage medium 412, a machine-readable storage medium. The computer program product includes instructions that, when read by a machine, operate to cause a data processing apparatus to store image data in the mobile device. In some embodiments, the computer program product includes instructions that determine the intent of text entry upon request of a user of the mobile device.

The operating system 414 may be a LINUX-based operating system such as the GOOGLE mobile device platform; APPLE MAC OS X; MICROSOFT WINDOWS NT/WINDOWS 2000/WINDOWS XP/WINDOWS MOBILE; a variety of UNIX-flavored operating systems; or a proprietary operating system for computers or embedded systems. The application development platform or framework for the operating system 414 may be: BINARY RUNTIME ENVIRONMENT FOR WIRELESS (BREW); JAVA Platform, Micro Edition (JAVA ME) or JAVA 2 Platform, Micro Edition (J2ME) using the SUN MICROSYSTEMS JAVASCRIPT programming language; PYTHON™, FLASH LITE, or MICROSOFT .NET Compact, or another appropriate environment.

The device stores computer-executable code for the operating system 414, and the application programs 415 such as an email, instant messaging, a video service application, a mapping application word processing, spreadsheet, presentation, gaming, mapping, web browsing, JAVASCRIPT engine, or other applications. For example, one implementation may allow a user to access the GOOGLE GMAIL email application, the GOOGLE TALK instant messaging application, a YOUTUBE video service application, a GOOGLE MAPS or GOOGLE EARTH mapping application, or a GOOGLE PICASA imaging editing and presentation application. The application programs 415 may also include a widget or gadget engine, such as a TAFRI™ widget engine, a MICROSOFT gadget engine such as the WINDOWS SIDEBAR gadget engine or the KAPSULES™ gadget engine, a YAHOO! widget engine such as the KONFABULTOR™ widget engine, the APPLE DASHBOARD widget engine, the GOOGLE gadget engine, the KLIPFOLIO widget engine, an OPERA™ widget engine, the WIDSETS™ widget engine, a proprietary widget or gadget engine, or other widget or gadget engine the provides host system software for a physically-inspired applet on a desktop.

Although it is possible to provide for determining the intent of text entry using the above-described implementation, it is also possible to implement the functions according to the present disclosure as a dynamic link library (DLL), or as a plug-in to other application programs such as an Internet web-browser such as the FOXFIRE web browser, the APPLE® SAFARI® web browser or the MICROSOFT® INTERNET EXPLORER® web browser.

The navigation module 417 may determine an absolute or relative position of the device, such as by using the Global Positioning System (GPS) signals, the GLObal NAvigation Satellite System (GLONASS), the Galileo positioning system, the Beidou Satellite Navigation and Positioning System, an inertial navigation system, a dead reckoning system, or by accessing address, internet protocol (IP) address, or location information in a database. The navigation module 417 may also be used to measure angular displacement, orientation, or velocity of the device 300, such as by using one or more accelerometers.

Figure 5:
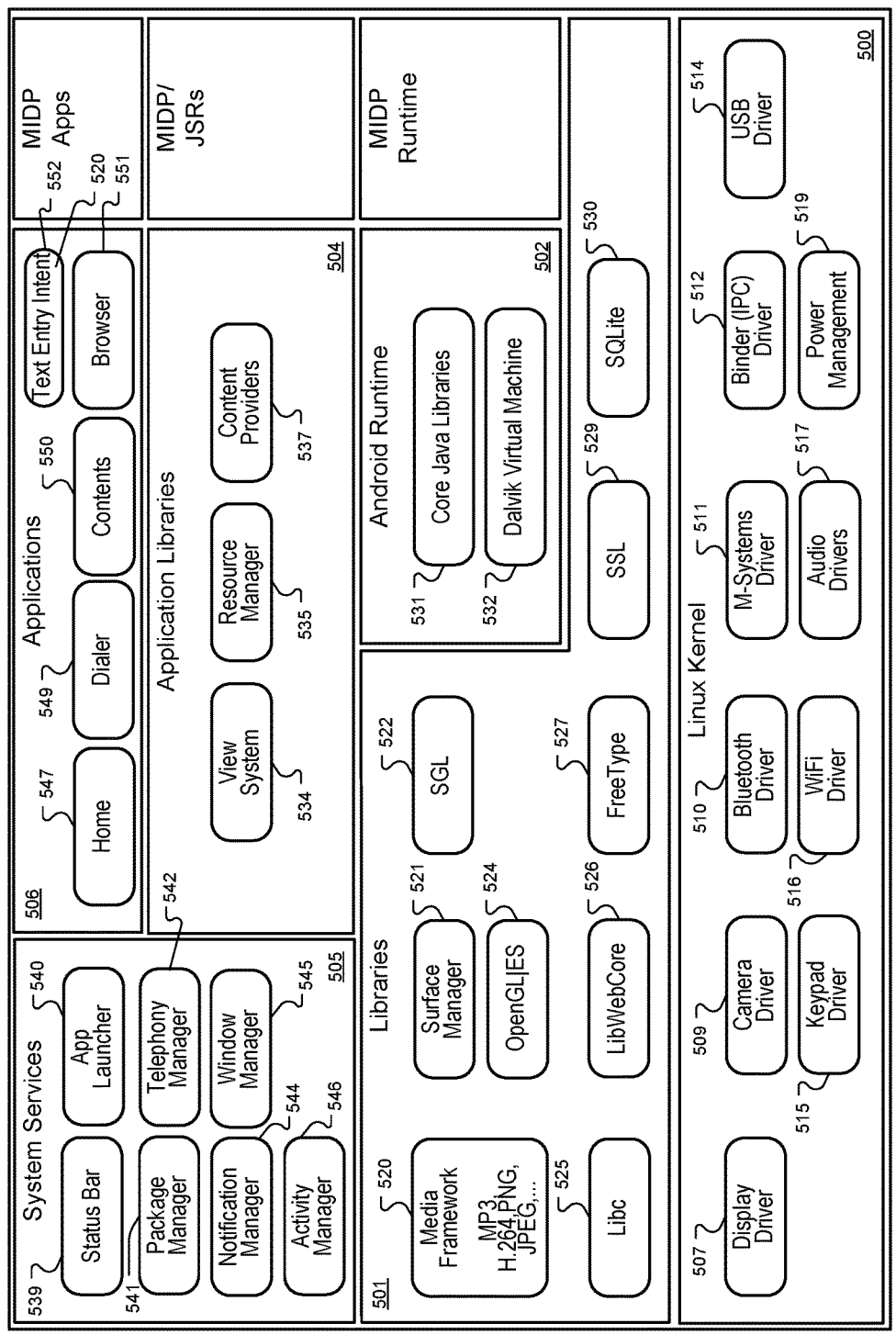
FIG. 5 is a block diagram illustrating exemplary components of the operating system used by the devices depicted in FIGS. 3A-3B.

FIG. 5 is a block diagram illustrating exemplary components of the operating system 414 used by the device 300 or 350, in the case where the GOOGLE® mobile device platform includes operating system 414. The operating system 414 invokes multiple processes, while ensuring that the associated phone application is responsive, and that wayward applications do not cause a fault (or "crash") of the operating system. Using task switching, the operating system 414 allows for the switching of applications while on a telephone call, without losing the state of each associated application. The operating system 414 may use an application framework to encourage reuse of components, and provide a scalable user experience by combining pointing device and keyboard inputs and by allowing for pivoting. Thus, the operating system can provide a rich graphics system and media experience, while using an advanced, standards-based web browser.

The operating system 414 can generally be organized into six components: a kernel 500, libraries 501, an operating system runtime 502, application libraries 504, system services 505, and applications 506. The kernel 500 includes a display driver 507 that allows software such as the operating system 414 and the application programs 415 to interact with the display 301 via the display interface 402, a camera driver 509 that allows the software to interact with the camera 307; a BLUETOOTH® driver 510; a M-Systems driver 511; a binder (IPC) driver 512, a USB driver 514 a keypad driver 515 that allows the software to interact with the keyboard 302 via the keyboard interface 404; a WiFi driver 516; audio drivers 517 that allow the software to interact with the microphone 309 and the speaker 310 via the sound interface 409; and a power management component 519 that allows the software to interact with and manage the power source 419.

The BLUETOOTH driver, which in one implementation is based on the BlueZ BLUETOOTH stack for LINUX-based operating systems, provides profile support for headsets and hands-free devices, dial-up networking, personal area networking (PAN), or audio streaming (such as by Advance Audio Distribution Profile (A2DP) or Audio/Video Remote Control Profile (AVRCP). The BLUETOOTH driver provides JAVA bindings for scanning, pairing and unpairing, and service queries.

The libraries 501 include a media framework 520 that supports standard video, audio and still-frame formats (such as Moving Picture Experts Group (MPEG)-4, H.264, MPEG-1 Audio Layer 5 (MP3), Advanced Audio Coding (AAC), Adaptive Multi-Rate (AMR), Joing Photographic Experts Group (JPEG), and others) using an efficient JAVA Application Programming Interface (API) layer; a surface manager 521; a simple graphics library (SGL) 522 for two-dimensional application drawing; an Open Graphics Library for Embedded Systems (OpenGL ES) 524 for gaming and three-dimensional rendering; a C standard library (LIBC) 525; a LIBWEBCORE library 526; a FreeType library 527; an SSL 529; and an SQLite library 530.

The operating system runtime 502 includes core JAVA libraries 531, and a Dalvik virtual machine 532. The Dalvik virtual machine 532 is a custom, virtual machine that runs a customized file format (.DEX).

The operating system 414 can also include Mobile Information Device Profile (MIDP) components such as the MIDP JAVA Specification Requests (JSRs) components, MIDP runtime, and MIDP applications as shown in FIG. 5. The MIDP components can support MIDP applications running on the device 300 or 350.

With regard to graphics rendering, a system-wide composer manages surfaces and a frame buffer and handles window transitions, using the OpenGL ES 524 and two-dimensional hardware accelerators for its compositions.

The Dalvik virtual machine 532 may be used with an embedded environment, since it uses runtime memory very efficiently, implements a CPU-optimized bytecode interpreter, and supports multiple virtual machine processes per device. The custom file format (.DEX) is designed for runtime efficiency, using a shared constant pool to reduce memory, read-only structures to improve cross-process sharing, concise, and fixed-width instructions to reduce parse time, thereby allowing installed applications to be translated into the custom file formal at build-time. The associated bytecodes are designed for quick interpretation, since register-based instead of stack-based instructions reduce memory and dispatch overhead, since using fixed width instructions simplifies parsing, and since the 16-bit code units minimize reads.

The application libraries 504 include a view system 534, a resource manager 535, and content providers 537. The system services 505 includes a status bar 539; an application launcher 540; a package manager 541 that maintains information for all installed applications; a telephony manager 542 that provides an application level JAVA interface to the telephony subsystem 420; a notification manager 544 that allows all applications access to the status bar and on-screen notifications; a window manager 545 that allows multiple applications with multiple windows to share the display 301; and an activity manager 546 that runs each application in a separate process, manages an application life cycle, and maintains a cross-application history.

The applications 506, include a home application 547, a dialer application 549, a contacts application 550, a browser application 551, and an text entry intent application 552.

The telephony manager 542 provides event notifications (such as phone state, network state, Subscriber Identity Module (SIM) status, or voicemail status), allows access to state information (such as network information, SIM information, or voicemail presence), initiates calls, and queries and controls the call state. The browser application 551 renders web pages in a full, desktop-like manager, including navigation functions. Furthermore, the browser application 551 allows single column, small screen rendering, and provides for the embedding of HTML views into other applications.

Figure 6:
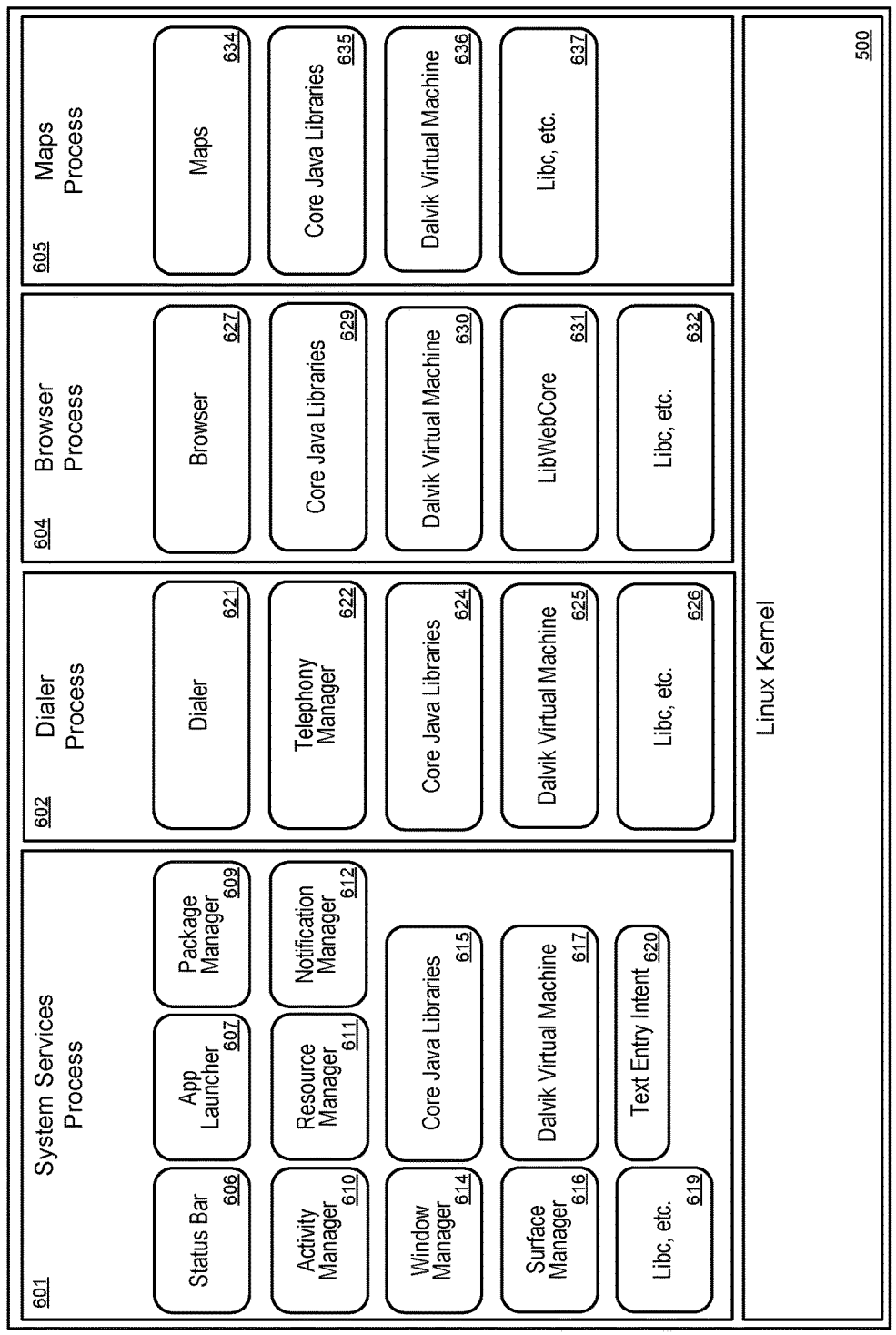
FIG. 6 is a block diagram illustrating exemplary processes implemented by the operating system kernel of FIG. 5.

FIG. 6 is a block diagram illustrating exemplary processes implemented by the operating system kernel 314. Generally, applications and system services run in separate processes, where the activity manager 546 runs each application in a separate process and manages the application life cycle. The applications run in their own processes, although many activities or services can also run in the same process. Processes are started and stopped as needed to run an application's components, and processes may be terminated to reclaim resources. Each application is assigned its own process, whose name is the application's package name, and individual parts of an application can be assigned another process name.

Some processes can be persistent. For example, processes associated with core system components such as the surface manager 616, the window manager 614, or the activity manager 610 can be continuously executed while the device 300 is powered. Additionally, some application-specific process can also be persistent. For example, processes associated with the dialer application 621, may also be persistent.

The processes implemented by the operating system kernel 500 may generally be categorized as system services processes 601, dialer processes 602, browser processes 604, and maps processes 605. The system services processes 601 include status bar processes 606 associated with the status bar 539; application launcher processes 607 associated with the application launcher 540; package manager processes 609 associated with the package manager 541; activity manager processes 610 associated with the activity manager 546; resource manager processes 611 associated with a resource manager that provides access to graphics, localized strings, and XML, layout descriptions; notification manger processes 612 associated with the notification manager 544; window manager processes 614 associated with the window manager 545; core JAVA libraries processes 615 associated with the core JAVA libraries 531; surface manager processes 616 associated with the surface manager 521; Dalvik virtual machine processes 617 associated with the Dalvik virtual machine 532, LIBC processes 619 associated with the LIBC library 525; and text entry intent processes 520 associated with the text entry intent application 552.

The dialer processes 602 include dialer application processes 621 associated with the dialer application 549; telephony manager processes 622 associated with the telephony manager 542; core JAVA libraries processes 624 associated with the core JAVA libraries 531; Dalvik virtual machine processes 625 associated with the Dalvik Virtual machine 532; and LIBC processes 626 associated with the LIBC library 525. The browser processes 604 include browser application processes 627 associated with the browser application 551; core JAVA libraries processes 629 associated with the core JAVA libraries 531; Dalvik virtual machine processes 630 associated with the Dalvik virtual machine 532; LIBWEBCORE processes 631 associated with the LIBWEBCORE library 526; and LIBC processes 632 associated with the LIBC library 525.

Figure 7:
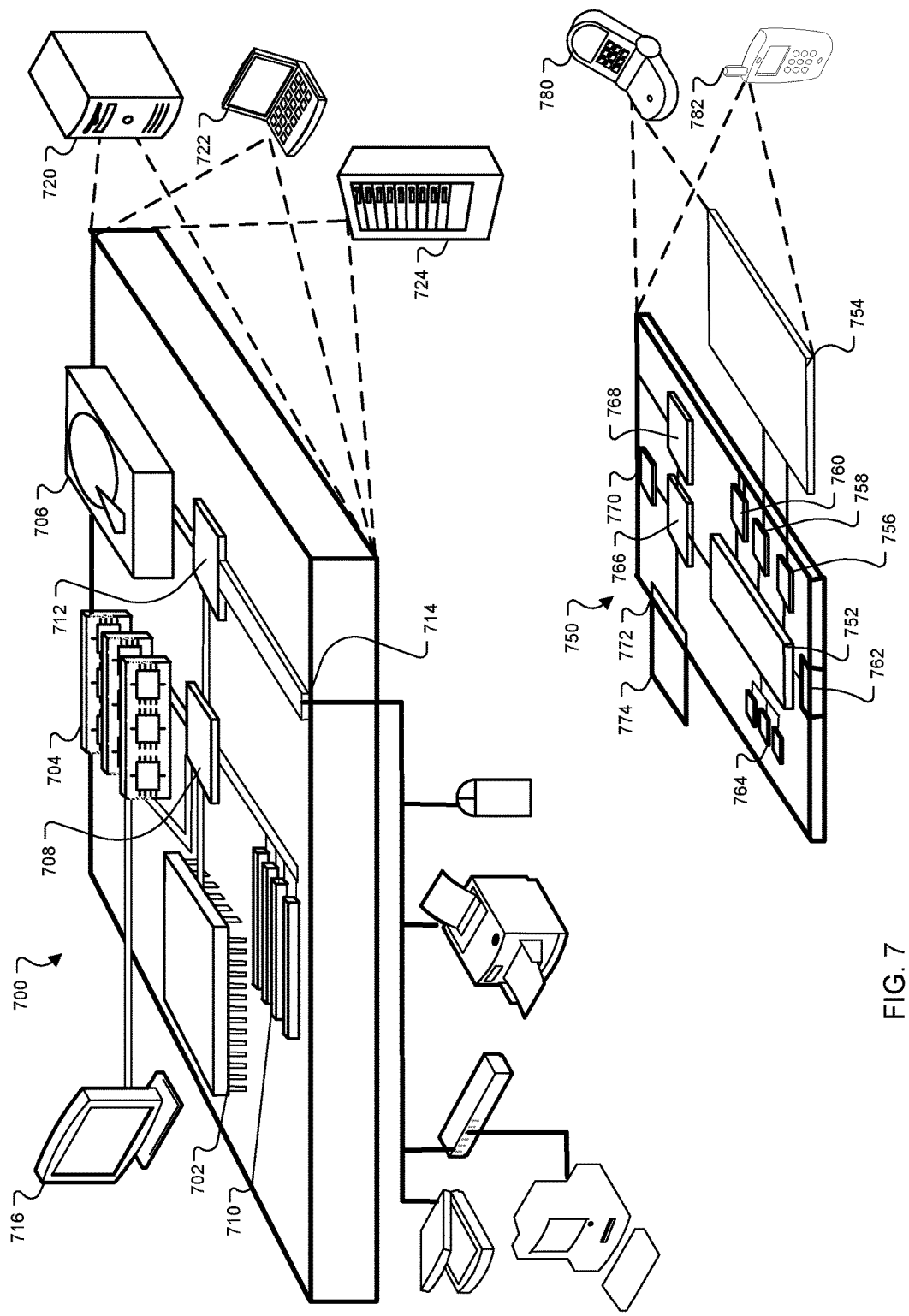
FIG. 7 shows an example of a computer device and a mobile computer device that can be used to implement the techniques described here.

The maps processes 605 include maps application processes 634, core JAVA libraries processes 635, Dalvik virtual machine processes 636, and LIBC processes 637. Notably, some processes, such as the Dalvik virtual machine processes, may exist within one or more of the systems services processes 601, the dialer processes 602, the browser processes 604, and the maps processes 605. FIG. 7 shows an example of a generic computer device 700 and a generic mobile computer device 750, which may be used with the techniques described here. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, memory on processor 702, or a propagated signal.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display) or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, memory on processor 752, or a propagated signal that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smartphone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. Accordingly, other embodiments are within the scope of the following claims.

What is claimed is:

1. A computer-implemented method for processing input entered using a plurality of input keys that each represent a respective number and a respective set of multiple alphabetic characters, the method comprising:
   receiving, by a computing system, an input key sequence that indicates two or more successively-selected input keys of the plurality of input keys;
   identifying, by the computing system, one or more candidate entries from a database that is accessible to the computing system, wherein each candidate entry is identified based on a determination that a first portion of an alphanumeric sequence represented by the candidate entry matches at least one of a plurality of alphanumeric sequences that are represented by the input key sequence;
   displaying, on a screen of the computing system, at least a subset of the identified one or more candidate entries;
   for each candidate entry in the at least a subset of candidate entries, applying to the display of the candidate entry a visual marking that visually distinguishes:
   (i) the first portion of the alphanumeric sequence represented by the candidate entry that was determined to match at least one of the plurality of alphanumeric sequences that are represented by the input key sequence, from
(ii) a second portion of the alphanumeric sequence represented by the candidate entry that was not determined to match any of the plurality of alphanumeric sequences that are represented by the input key sequence,
receiving, by the computing system, an indication that a user input selected a first candidate entry from the at least a subset of candidate entries; and
in response to receiving the indication that the user input selected the first candidate entry, applying the first candidate entry to a process invoked on the computing system.

2. The computer-implemented method of claim 1, wherein a first candidate entry of the one or more candidate entries is a telephone number or a contact name.

3. The computer-implemented method of claim 1, wherein the one or more candidate entries identified by the computing system include multiple candidate entries.

4. The computer-implemented method of claim 1, wherein the plurality of input keys includes multiple input keys of a telephone keypad.

5. The computer-implemented method of claim 1, wherein:
the alphanumeric sequence represented by a first candidate entry of the one or more candidate entries includes a beginning portion of one or more first alphanumeric characters, a middle portion of one or more second alphanumeric characters that follow the one or more first alphanumeric characters, and an ending portion of one or more third alphanumeric characters that follow the one or more second alphanumeric characters; and
identifying the first candidate entry comprises determining that only the middle portion of the alphanumeric sequence represented by the first candidate entry matches at least one of the plurality of alphanumeric sequences that are represented by the input sequence.

6. The computer-implemented method of claim 5, comprising applying the visual marking to the first candidate entry by increasing a visual prominence of the middle portion of the alphanumeric sequence represented by the first candidate entry relative to a visual prominence of the beginning and ending portions of the alphanumeric sequence represented by the first candidate entry.

7. The computer-implemented method of claim 1, wherein:
the database stores a plurality of candidate entries, and
identifying the one or more candidate entries comprises selecting a subset of the plurality of candidate entries that are stored in the database, the subset excluding at least some entries of the plurality of candidate entries.

8. The computer-implemented method of claim 1, wherein for each candidate entry in the subset of candidate entries, applying the visual marking to the display of the candidate entry comprises drawing a box around the first portion of the alphanumeric sequence represented by the candidate entry that was determined to match at least one of the plurality of alphanumeric sequences that are represented by the input key sequence, to the exclusion of the second portion of the alphanumeric sequence represented by the candidate entry that was not determined to match any of the plurality of alphanumeric sequences that are represented by the input key sequence.

9. The computer-implemented method of claim 1, wherein applying the first candidate entry to the process invoked on the computing system comprises invoking an application based on the first candidate entry.

10. The computer-implemented method of claim 9, wherein invoking the application based on the first candidate entry comprises:
(i) using a contact name or a phone number from the first candidate entry in a phone application,
(ii) expanding a display of the first candidate entry to show additional information about a contact associated with the first candidate entry,
(iii) using the first candidate entry to compose an email in an email application,
(iv) using the first candidate entry to compose a text message in a text messaging application, or
(v) launching an internet connection screen showing a website associated with a contact identified by the first candidate entry.

11. A computing system, comprising:
a keypad that includes a plurality of input keys, each input key representing a respective number and a respective set of multiple alphabetic characters;
one or more processors; and
a non-transitory computer-readable storage medium having instructions stored thereon that, when executed by the one or more processors, cause the one or more processors to perform operations comprising:
receiving an input key sequence that indicates two or more successively-selected input keys of the plurality of input keys;
identifying one or more candidate entries, wherein each candidate entry is identified based on a determination that a first portion of an alphanumeric sequence represented by the candidate entry matches at least one of a plurality of alphanumeric sequences that are represented by the input key sequence;
displaying at least a subset of the identified one or more candidate entries;
for each candidate entry in the at least a subset of candidate entries, applying to the display of the candidate entry a visual marking that visually distinguishes:
(i) the first portion of the alphanumeric sequence represented by the candidate entry that was determined to match at least one of the plurality of alphanumeric sequences that are represented by the input key sequence, from
(ii) a second portion of the alphanumeric sequence represented by the candidate entry that was not determined to match any of the plurality of alphanumeric sequences that are represented by the input key sequence;
receiving an indication that a user input selected a first candidate entry from the at least a subset of candidate entries; and
in response to receiving the indication that the user input selected the first candidate entry, applying the first candidate entry to a process invoked on the computing system.

12. The computing system of claim 11, wherein a first candidate entry of the one or more candidate entries is a telephone number or a contact name.

13. The computing system of claim 11, wherein the one or more candidate entries identified by the computing system include multiple candidate entries.

14. The computing system of claim 11, wherein the plurality of input keys includes multiple input keys of a telephone keypad.

15. The computing system of claim 11, wherein:
the alphanumeric sequence represented by a first candidate entry of the one or more candidate entries includes a beginning portion of one or more first alphanumeric characters, a middle portion of one or more second alphanumeric characters that follow the one or more first alphanumeric characters, and an ending portion of one or more third alphanumeric characters that follow the one or more second alphanumeric characters; and
identifying the first candidate entry comprises determining that only the middle portion of the alphanumeric sequence represented by the first candidate entry matches at least one of the plurality of alphanumeric sequences that are represented by the input sequence.

16. The computing system of claim 15, wherein the operations comprise applying the visual marking to the first candidate entry by increasing a visual prominence of the middle portion of the alphanumeric sequence represented by the first candidate entry relative to a visual prominence of the beginning and ending portions of the alphanumeric sequence represented by the first candidate entry.

17. The computing system of claim 11, wherein for each candidate entry in the subset of candidate entries, applying the visual marking to the display of the candidate entry comprises drawing a box around the first portion of the alphanumeric sequence represented by the candidate entry that was determined to match at least one of the plurality of alphanumeric sequences that are represented by the input key sequence, to the exclusion of the second portion of the alphanumeric sequence represented by the candidate entry that was not determined to match any of the plurality of alphanumeric sequences that are represented by the input key sequence.

18. A non-transitory computer-readable storage medium having instructions stored thereon that, when executed by one or more processors of a computing system, cause performance of operations comprising:
receiving an input key sequence that indicates two or more successively selected input keys of a plurality of input keys, wherein each input key of the plurality of input keys represents a respective number and a respective set of multiple alphabetic characters;
identifying one or more candidate entries, wherein each candidate entry is identified based on a determination that a first portion of an alphanumeric sequence represented by the candidate entry matches at least one of a plurality of alphanumeric sequences that are represented by the input key sequence;
displaying at least a subset of the identified one or more candidate entries;
for each candidate entry in the at least a subset of candidate entries, applying to the display of the candidate entry a visual marking that visually distinguishes:
(i) the first portion of the alphanumeric sequence represented by the candidate entry that was determined to match at least one of the plurality of alphanumeric sequences that are represented by the input key sequence, from
(ii) a second portion of the alphanumeric sequence represented by the candidate entry that was not determined to match any of the plurality of alphanumeric sequences that are represented by the input key sequence;
receiving an indication that a user input selected a first candidate entry from the at least a subset of candidate entries; and
in response to receiving the indication that the user input selected the first candidate entry, applying the first candidate entry to a process invoked on the computing system.

19. The computer-readable storage medium of claim 18, wherein a first candidate entry of the one or more candidate entries is a telephone number or a contact name.

20. The computer-readable storage medium of claim 18, wherein:
the alphanumeric sequence represented by a first candidate entry of the one or more candidate entries includes a beginning portion of one or more first alphanumeric characters, a middle portion of one or more second alphanumeric characters that follow the one or more first alphanumeric characters, and an ending portion of one or more third alphanumeric characters that follow the one or more second alphanumeric characters; and
identifying the first candidate entry comprises determining that only the middle portion of the alphanumeric sequence represented by the first candidate entry matches at least one of the plurality of alphanumeric sequences that are represented by the input sequence.

21. The computer-readable storage medium of claim 20, wherein the operations comprise applying the visual marking to the first candidate entry by increasing a visual prominence of the middle portion of the alphanumeric sequence represented by the first candidate entry relative to a visual prominence of the beginning and ending portions of the alphanumeric sequence represented by the first candidate entry.

22. The computer-readable storage medium of claim 18, wherein for each candidate entry in the subset of candidate entries, applying the visual marking to the display of the candidate entry comprises drawing a box around the first portion of the alphanumeric sequence represented by the candidate entry that was determined to match at least one of the plurality of alphanumeric sequences that are represented by the input key sequence, to the exclusion of the second portion of the alphanumeric sequence represented by the candidate entry that was not determined to match any of the plurality of alphanumeric sequences that are represented by the input key sequence.

* * * * *

UNITED STATES PATENT AND TRADEMARK OFFICE
CERTIFICATE OF CORRECTION

PATENT NO. : 10,437,887 B1
APPLICATION NO. : 15/373346
DATED : October 8, 2019
INVENTOR(S) : Wei Huang Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 359 days.

Signed and Sealed this
Thirtieth Day of June, 2020

Andrei Iancu
*Director of the United States Patent and Trademark Office*